US006714918B2

(12) United States Patent
Hillmer et al.

(10) Patent No.: US 6,714,918 B2
(45) Date of Patent: Mar. 30, 2004

(54) SYSTEM AND METHOD FOR DETECTING FRAUDULENT TRANSACTIONS

(75) Inventors: James M. Hillmer, Grand Rapids, MI (US); Richard A. Jones, Grand Rapids, MI (US); Colleen M. Gessner, Grand Rapids, MI (US); Connie S. Johnston, Grand Rapids, MI (US); Kelly R. Lewis, Jr., Kentwood, MI (US); Sanjay H. Deshpande, Grand Rapids, MI (US)

(73) Assignee: Access Business Group International LLC, Ada, MI (US)

( * ) Notice: Subject to any disclaimer, the term of this patent is extended or adjusted under 35 U.S.C. 154(b) by 0 days.

(21) Appl. No.: 10/298,625

(22) Filed: Nov. 18, 2002

(65) Prior Publication Data

US 2003/0069820 A1 Apr. 10, 2003

Related U.S. Application Data

(62) Division of application No. 09/535,298, filed on Mar. 24, 2000.

(51) Int. Cl.[7] .............................................. G06F 17/60
(52) U.S. Cl. ............................. 705/18; 705/44; 713/182
(58) Field of Search ...................... 705/18, 44; 713/182

(56) References Cited

U.S. PATENT DOCUMENTS

| | | | | |
|---|---|---|---|---|
| 5,025,372 A | | 6/1991 | Burton et al. ................ 364/406 |
| 5,163,086 A | | 11/1992 | Ahearn et al. ................. 379/91 |
| 5,416,067 A | | 5/1995 | Van Haften et al. ........ 504/323 |
| 5,627,886 A | * | 5/1997 | Bowman ..................... 379/111 |
| 5,745,654 A | | 4/1998 | Titan ........................... 395/22 |
| 5,774,525 A | * | 6/1998 | Kanevsky et al. ............. 379/88 |
| 5,790,645 A | | 8/1998 | Fawcett et al. .............. 379/189 |
| 5,805,686 A | | 9/1998 | Moller et al. ................ 379/198 |
| 5,819,226 A | | 10/1998 | Gopinathan et al. ........... 705/1 |
| 5,832,068 A | | 11/1998 | Smith .......................... 379/113 |
| 5,884,289 A | | 3/1999 | Anderson et al. .............. 705/44 |
| 5,895,453 A | | 4/1999 | Cook ............................ 705/22 |

(List continued on next page.)

FOREIGN PATENT DOCUMENTS

| | | | | |
|---|---|---|---|---|
| DE | 0891068 | | 1/1999 | ............ H04M/3/36 |
| EP | 0468229 | | 1/1992 | ............. G06F/9/44 |
| EP | 500245 A2 | * | 8/1992 | .................. 705/18 |
| FR | 0418144 | | 3/1991 | ........... G06F/15/21 |
| GB | 0421808 | | 4/1991 | ........... G06F/15/30 |
| JP | 62074768 | | 4/1987 | ............. B62D/7/14 |
| JP | 63184870 | | 7/1988 | ........... G06F/15/30 |
| JP | 4113220 | | 4/1992 | ............. G01D/3/00 |
| JP | 4220758 | | 8/1992 | ........... G06F/15/18 |
| WO | WO 89/06398 | | 7/1989 | ........... G06F/15/30 |

OTHER PUBLICATIONS

Hanagandi, Density–based clustering and radial basis function modeling to generate fraud soies, IEE/IAFE 1996 Conference on Computational Intelligence p. 241–251, 1996.*

Miguel Helft, The Standard, Feb. 28, 2000, "The Real Victims of Fraud", obtained at the internet address http://www.thestandard.com/article print/1,1153,11974,00.html.

(List continued on next page.)

Primary Examiner—Joseph A. Fischetti
(74) Attorney, Agent, or Firm—Brinks Hofer Gilson & Lione (57) ABSTRACT

A system for detecting fraudulent transactions is disclosed. The system breaks the transaction down into its component parameters. A first score is computed depending on the propensity of the transacted commodity to be involved in fraud. A second score is computed as a function of the authentication of the remaining parameters of the transaction. A total fraud score is computed from the first score and the second score and compared against a fraud threshold to determine the likelihood of the transaction being fraudulent.

6 Claims, 9 Drawing Sheets

U.S. PATENT DOCUMENTS

| | | | | |
|---|---|---|---|---|
| 5,936,221 A | * | 8/1999 | Corder et al. | 235/380 |
| 5,936,541 A | * | 8/1999 | Stambler | 340/825.33 |
| 5,950,121 A | * | 9/1999 | Kaminsky et al. | 455/410 |
| 6,018,723 A | * | 1/2000 | Siegel et al. | 705/44 |
| 6,029,154 A | | 2/2000 | Pettitt | 705/44 |
| 6,095,413 A | * | 8/2000 | Tetro et al. | 235/380 |
| 6,154,146 A | * | 11/2000 | Lueder et al. | 340/825.34 |
| 6,163,604 A | * | 12/2000 | Baulier et al. | 379/189 |
| 6,163,771 A | * | 12/2000 | Walker et al. | 705/18 |
| 6,219,771 B1 | * | 4/2001 | Kikuchi et al. | 711/164 |
| 6,298,336 B1 | * | 10/2001 | Davis et al. | 705/18 |
| 6,418,436 B1 | * | 7/2002 | Degen et al. | 707/6 |
| 6,464,134 B1 | * | 10/2002 | Page | 235/379 |
| 6,516,413 B1 | * | 2/2003 | Aratani et al. | 713/170 |

OTHER PUBLICATIONS

Rachel Konrad, CNET News.com, Mar. 24, 2000, "Visa Offers Guide to Keep Credit Card Numbers Safe", obtained at the internet address http://www.cnet.com–news–e–commerce.

USSS Financial Crimes Division, "Investigations Financial Crime Division", obtained at internet address http://www.treas.gov/usss/financial crimes.htm, Mar. 10, 2000.

Andreas S. Weigend, David E. Rumelhart & Bernardo A. Huberman, "Generalization by Weight–Elimination with Application to Forecasting", pp. 875–882.

Robert Hecht–Nielsen, "III.3 Theory of the Backpropagation Neural Network", pp. 65–93. Based on "Theory of the Backpropagation Neural Network" by Robert Hecht–Nielsen, which appeared in *Proceedings of the International Joint Conference on Neural Networks* 1, 593–611, Jun. 1989, © 1989 IEEE.

David E. Rumelhart, Geoffrey E. Hinton, and Ronald J. Williams, "Learning Representations by Back–propagating errors", *Nature 323:533–536*, Copyright © 1986 Macmillan Magazines Limited.

CyberSource©, "Managing Risk on the Net", White Paper, Copyright 2000 CyberSource Corporation.

CyberSource©, Risk Management Services, "Internet Fraud Screen, Enhanced by Visa–Overview", pp. 1–2, obtained at internet address http://www.cybersource.com/services/risk/, Feb. 29, 2000.

CyberSource©, Risk Management Services, "Internet Fraud Screen Enhanced by Visa—How it Works", pp. 1–4, obtained at internet address http://www.cybersource.com/services/risk/howitworks.html, Feb. 29, 2000.

Sherry L. Harowitz, Security Management magazine, "A World of Possibilities," pp. 41–47, Jan. 2000.

Maria Seminerio, PC Week, Dec. 13, 1999, "Strategies Cutting Out e–fraud," pp. 99–100.

eFalcon™, Internet Credit Card Fraud Detection and Risk–Management Service, Whitepaper, "Getting Ready for Your eFalcon Systems," (for Online Merchants), Version 3.2.

Karen Gullo, "Neural Nets Versus Card Fraud," article, Feb. 2, 1990.

PCT International Search Report, PCT/US 93/08400.

Borowsky, M. "Trying To Even The Score," Credit Card Management, Journal Article v8, n2, pp. 52–53, May 1995.

Spillane, T. "Advanced Tools For Cards Fraud Detection," Retail Banker International, Trade Newsletter, p. 28, Oct. 21, 1998.

Report of OECD Technical Advisory Group on E–Commerce Technology, (TAG) news release Feb. 14, 2001.

PCT International Search Report, PCT/US01/08815.

* cited by examiner

SYSTEM AND METHOD FOR DETECTING FRAUDULENT TRANSACTIONS

"This application is a division of application Ser. No. 09/535,298, filed Mar. 24, 2000, (pending), which is hereby incorporated by reference herein."

BACKGROUND

Everyday, millions of commercial transactions take place between customers and vendors of goods and/or services ("commodities"). Many of these transactions are consummated face to face in physical retail establishments, over the telephone, such as with catalog based vendors, through the Internet with e-commerce based vendors or through some combination thereof.

Each of these transactions involves the exchange of value, such as cash/currency, bank draft/check or credit, for commodities. One other commonality that all of these transactions share is the potential that the customer making the transaction is acting fraudulently to acquire the commodities from the vendor.

Fraud often occurs when the customer knowingly utilizes some form of value, such as a bank draft/check or credit card that has no value or does not belong to the customer. For example, a customer writes a check knowing there are no funds to back up that check or utilizes a fraudulently obtained or stolen credit card. While fraudulent transactions only make up a small percentage of the total number of transactions completed at any given time, the amount of revenue and/or resources lost due to fraud is substantial.

Vendors of goods and services rely on a number of different methods to detect fraudulent transactions. Some rely on the fraud detection systems of third party credit card processors or third party check verification systems to determine if the customer is trying to commit fraud. Other vendors rely on internal fraud detection systems. In either case, it is preferable to detect the fraudulent transaction before the customer receives the commodities, prevent the loss to the vendor in the first place and reduce or eliminate the expense of resources devoted to attempting to recover those commodities and/or financial compensation.

An important characteristic of these fraud detection systems is their error rate. Errors include false negative responses, where a fraudulent transaction goes undetected and false positive responses, where valid transactions are mis-flagged as fraudulent. A high false negative rate indicates that the system is not performing its intended function and results in continued losses to the vendor due to fraud. A high false positive rate costs the vendor in potentially lost sales and lost resources in further investigating and validating the mis-flagged transactions.

One typical fraud detection system functions by analyzing parameters of the transaction and attempting to identify characteristics which indicate that the transaction is fraudulent. This system breaks down the transaction into a few select component data parameters and single variable relationships. Points are assigned to each parameter/relationship based on the information it represents and whether it matches with known data. If the number of points of any one parameter/relationship exceeds a pre-determined threshold, potential fraud is indicated. Alternatively, the points of all of the parameters/relationships are summed to create a total score and then that total score is compared to a threshold. If the total score exceeds the threshold, fraudulent activity may be indicated within the transaction. An exemplary fraud detection system utilizing single parameters or relationships to identify a primary fraud characteristic is shown in more detail in U.S. Pat. No. 6,029,154, entitled "METHOD AND SYSTEM FOR DETECTING FRAUD IN A CREDIT CARD TRANSACTION OVER THE INTERNET" to Pettitt.

Another fraud detection system utilizes a more complex predictive model, such as a neural network or other form of model which utilizes self-learning of relationships among variables from historical transaction data. This system uses these complex models to analyze the transaction and predict whether or not the transaction is potentially fraudulent. The model is able to automatically correlate relationships among all of the parameters of the transaction to each other, and not just the single variable relationships of the above detection system. An exemplary fraud detection system utilizing these self-learning models is shown in more detail in U.S. Pat. No. 5,819,226, entitled "FRAUD DETECTION USING PREDICTIVE MODELING" to Gopinathan, et al. Self-learning based systems are complex, difficult to develop and require significant training and maintenance to maintain accuracy.

SUMMARY

The present invention is defined by the following claims, and nothing in this section should be taken as a limitation on those claims. By way of introduction, the preferred embodiments described below relate to a method for detecting fraudulent transactions between a customer and a vendor. The method includes receiving a plurality of transaction parameters from the vendor, where the plurality of transaction parameters represents at least one transaction for at least one commodity between the customer and the vendor. A first score is computed as a function of each commodity involved in the transaction. A second score is computed as a function of each of a first one or more of the plurality of transaction parameters. A fraud score is computed based on the first and second scores. The transaction is indicated to be potentially fraudulent if the fraud score exceeds a first pre-determined threshold.

The preferred embodiments further relate to a fraud detection processor. The processor includes a receiver operative to receive a plurality of transaction parameters from a vendor, where the plurality of transaction parameters represents at least one transaction for one or more commodities between a customer and the vendor. The processor also includes a first score processor coupled with the receiver and operative to compute a first score as a function of each of the one or more commodities. In addition, the processor includes a second score processor coupled with the receiver and operative to compute a second score as a function of each of a first one or more of the plurality of transaction parameters. Further, the processor includes a fraud score processor coupled with the first and second score processors and operative to compute a fraud score based on the first and second scores. Finally, the processor includes fraud determination logic coupled with the fraud score processor and operative to compute a determination of whether the at least one transaction is potentially fraudulent based on a comparison of the fraud score and a first pre-determined threshold and further operative to indicate this determination to the vendor.

DETAILED DESCRIPTION OF THE PRESENTLY PREFERRED EMBODIMENTS

The disclosed fraud detection system is easily maintained and updated and has a low error rate. Further, the disclosed system is modular, being able to be sold and/or provided, in whole or in part, as a service or product to one or more vendors. It will be appreciated that the system, as a service or product, may also be embodied as hardware and/or software and packaged, in whole or in part, as a fraud detection processor. The preferred fraud detection system or processor is comprised of a number of component parts as described below. One or more components of the system or processor may be deployed as part of a vendor's internal transaction processing system while the remainder of the system or processor is operated by an entity, external to, and in communication with the vendor.

In one embodiment, the entire system resides internally as a part of, or coupled with, the vendor's order processing system in compliance with all of its interfaces and gateways. Herein, the phrase "coupled with" is defined to mean directly connected to or indirectly connected with through one or more intermediate components. Such intermediate components may include both hardware and software based components.

Alternatively, most of the fraud detection processing is offloaded to a consumer information provider. Where the consumer information provider is an entity external to the vendor, costs, maintenance, storage and processing considerations are alleviated for the vendor. In addition, centralization of the fraud detection process allows multiple vendors to pool information resources thereby enhancing the detection of fraud.

Further, in yet another alternative embodiment, the entire system resides externally to the vendor and in communication with the vendor's order processing system and is provided, as a "black box" service for example, by the external entity (i.e. transaction parameters are transmitted to the external entity and the external entity returns a fraud indication result). It will be appreciated that the alternative preferred embodiments disclosed herein relate to alternate divisions of the system's components between the vendor and the external fraud processing entity and that all embodiments of the disclosed fraud detection system are contemplated no matter how the division of its component parts is made.

To support multiple vendors, the system is configurable to account for the varying transactional characteristics of each participating vendor, allows each participating vendor the ability to individually re-configure the system to reduce error rates and permits each participating vendor to provide internal statistical, demographic and historical transaction data and/or have access to such data from other vendors (participating or not) to enhance the detection of fraud.

Figure 1:
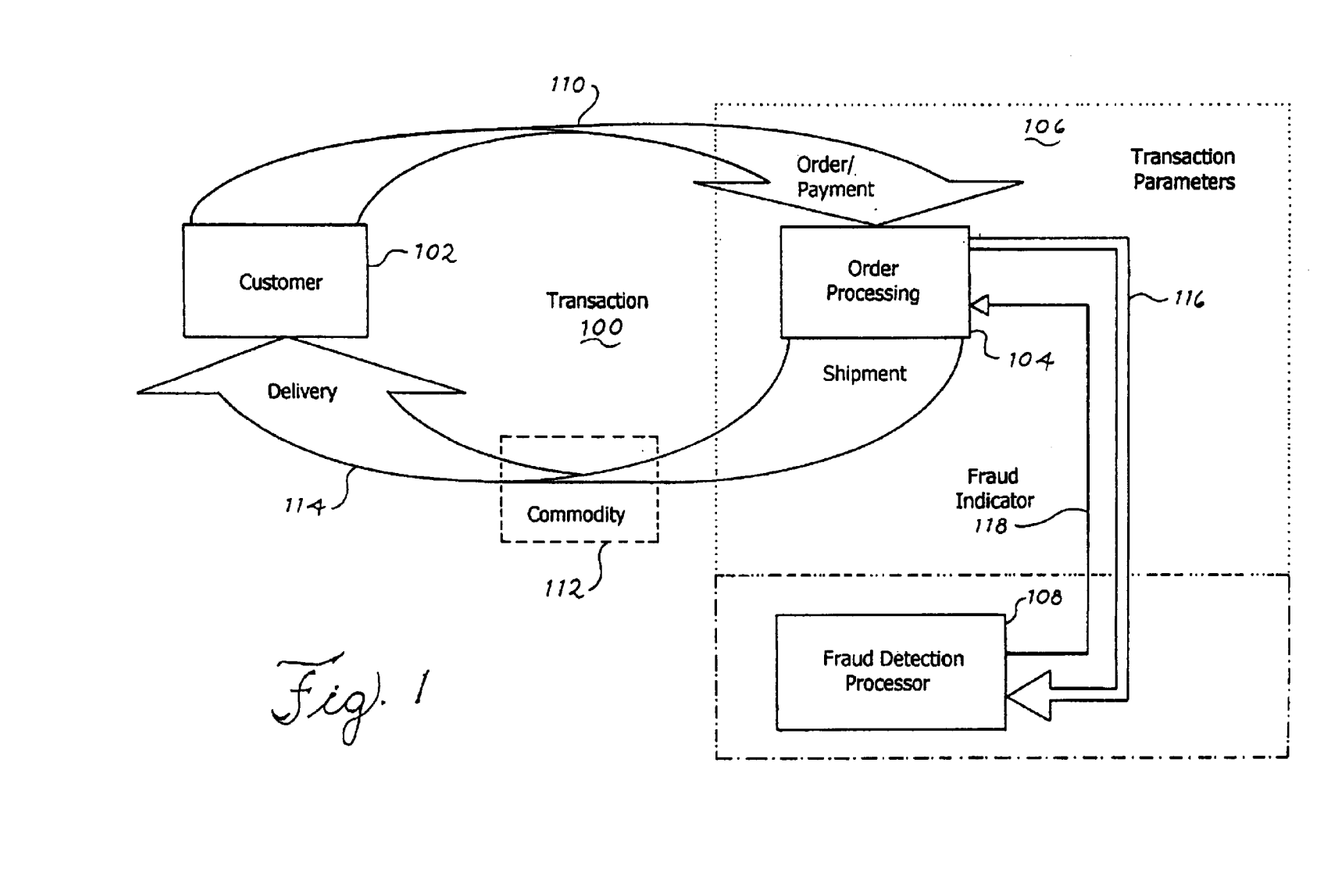
FIG. 1 depicts a block diagram of an exemplary commercial transaction utilizing the preferred fraud detection system.

FIG. 1 shows an exemplary transaction 100 between a customer 102 and a vendor 106. The transaction 100 comprises the purchase of a commodity 112 from the vendor 106. Herein, a commodity 112 is a good and/or service or anything else purchased or traded for value. The customer 102 desires the commodities 112 and the vendor 106 provides the commodities 112. In one embodiment, the customer 102 is another vendor.

To complete the transaction 100, the customer 102 interfaces with the order processing component 104 of the vendor 106, orders 110 a commodity 112 and provides payment information. The vendor 106 processes the order 110, accepts the payment and delivers 114 the commodity 112 to the customer 102.

The transaction 100 can occur in one or more of many different environments. For example, the transaction 100 occurs in a retail establishment between a customer 102 and a cashier (the order processor 104) working for the vendor 106. Alternatively, the transaction occurs between a customer 102 and a catalog based vendor 106 using a telephone order processing system 104 (live operator, automated or a combination thereof) or between a customer 102 and an electronic commerce ("e-commerce") based vendor 106 using an Internet, network or wireless based order processing system 104. The order processor 104 may even be a vending machine, including a machine used to dispense gasoline. The order processing system 104 may be manual, automated or a combination thereof.

Where the customer 102 attempts to use a credit form of payment, such as a credit card, debit card or bank draft/check, there is an opportunity for defrauding the vendor 106. In such cases, it is preferable to detect such fraudulent activity before the commodity 112 is delivered to the customer 102. Early detection prevents loss of revenue or resources by the vendor 106.

FIG. 1 further shows a fraud detection system 108 which interfaces with the order processing system 104 of the vendor 106 in order to detect fraudulent activity on the part of the customer 102. The system 108 is capable of determining whether or not the transaction 100 is potentially fraudulent while the transaction 100 is still pending, before the commodities 112 have been delivered to the customer 102. Alternatively, the system 108 is capable of analyzing the transaction 100 at a later time to determine whether the payment was potentially fraudulent. Both real-time processing and batch processing are contemplated.

The fraud detection system 108 receives transaction parameters 116 from the vendor's 106 order processing system 104. The transaction parameters 116 represent the pieces of information which make up the transaction 100. Exemplary transaction parameters 116 include the customer's name, address and telephone number, the identity of the commodity being transacted (also known as a "Stock Keeping Unit" or "SKU" number) and the information related to the form of payment being used such as a credit card number or checking account number. A SKU is unique identifier code which identifies a particular commodity. Other parameters 116 may include an alternate shipping address to account for a customer 102 who places an order and has it shipped to an alternate address, such as for a gift.

These transaction parameters 116 may be vendor 106 specific or generic to all vendors 106. Some transaction parameters 116 are based on the nature of the order processing system's 104 requirements to process a given order. For example, a vendor 106 which transacts in products which are not delivered (such as a service), may not collect a shipping address and therefore would not collect this particular transaction parameter 116. Further, e-commerce based vendors 106 may have access to additional parameters 116 such as Internet Protocol addresses, domain addresses or electronic mail addresses. The preferred embodiments disclosed herein are designed to account for the different transaction parameters 116 collected by or available from different vendors 106 and are capable of being configured to account for the availability or unavailability of transaction parameters 116 in the determination of fraud. Table 1.0 (See below) gives a non-exhaustive list of the transaction parameters 116 of the preferred embodiments.

The fraud detection system 108 accepts the transaction parameters 116 from the order processing system 104 and analyzes those parameters 116, as discussed below in more detail. The fraud detection system 108 provides a result or signal 118 to the order processing system 104 signifying whether or not the analyzed transaction parameters 116 indicate that the transaction 100 is likely fraudulent. In one embodiment the result or signal 118 is a binary indicator of fraud or no fraud. Alternatively, the result or signal 118 may be numeric or other data indicating the likelihood of fraud, for example, as compared to a fraudulent value scale. The order processing system 104 is then able to account for that result or signal 118 in the processing of the transaction 100. If the transaction 100 is still pending, the order processing system 104 may pass off the transaction 100 to a manual or automated investigation system, terminate the transaction 100 before the commodities 112 are shipped or delivered 114 or demand further information or an alternative form of payment from the customer before shipping or delivering the commodities 112. Alternatively, the order processing system 104 may utilize internal fraud detection systems to double-check or override the fraud indication signal 118 from the fraud detection system 108. If the transaction 100 has already been completed and the commodities 112 have been shipped to the customer 102, the fraud indicator signal 118 may be used by the order processing system 104 to institute loss mitigation or recovery measures such as recalling the shipped commodities 112 back from the shipping agent or handing over the transaction to an internal or external investigation/collections entity. Transactions 100 determined to be potentially fraudulent or non-fraudulent may also be updated into the appropriate negative (described in more detail below and in FIG. 2B) or positive database (described in more detail below and in FIG. 2A) for use in processing and preventing losses from later transactions 100 by the same customer 102.

First Embodiment

Figure 2A:
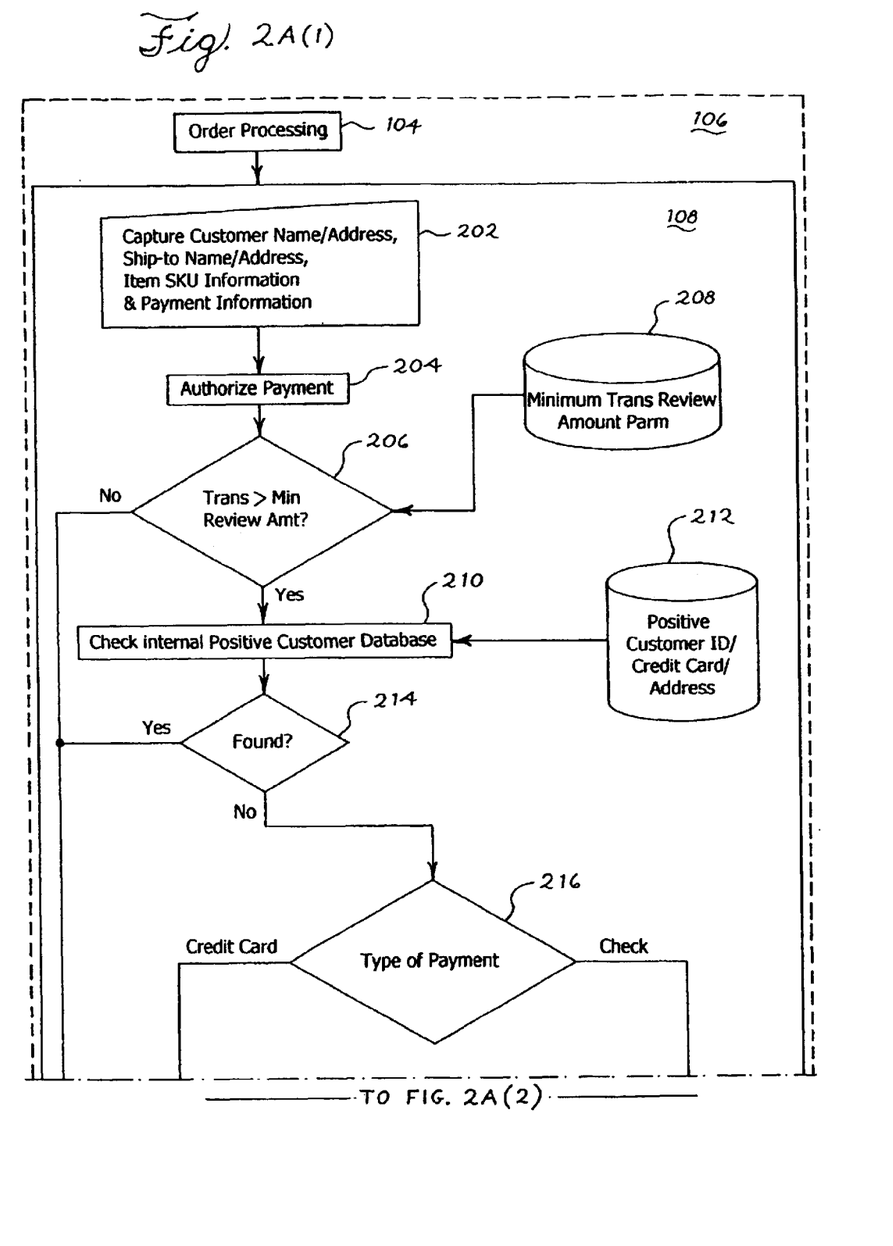
FIGS. 2A & 2B depicts a flow chart detailing a first embodiment of a preferred fraud detection system.

Referring now to FIG. 2A, there is shown a flow chart depicting a first embodiment of a fraud detection system 108. Internally to the vendor 106, the order processing system 104 receives a transaction 100 and initiates the fraud detection process. The fraud detection system 108 receives initial transaction parameters 116 from the order processing system 104 (Block 202).

The system performs a payment authorization check (Block 204). This check involves contacting either an external credit card issuing company or third party check verification service. Alternatively, internal checks are performed for vendor issued credit accounts. The external issuing company or authorization service performs an authorization process on the transaction 100, as is known in the art. This authorization process typically catches stolen credit cards or checks which have already been reported to the issuing company. Further, the authorization process indicates whether the customer has exceeded a credit limit or available funds.

Alternatively, for credit card transactions, the authorization check includes Address Verification checking ("AVS"), Card Verification Value Checking ("CVV2"), other fraud detection processes now or later developed by credit card issuing or authorization companies, or combinations thereof. AVS checking performs an additional check, beyond verifying funds and credit card status, to ensure that elements of the address supplied by the customer 102 match those on record with the issuing company. AVS checks can return results indicating that data is unavailable, or that there is a mismatch or a total or partial match. AVS checking can be repeated with manually tweaked addresses and/or names to correct misspellings, incorrectly specified billing addresses, and other customer service/order entry mistakes.

CVV2 checking determines whether or not the customer 102 is actually in possession of the physical credit card by asking for an identification code imprinted only on the card in a manner which does not get reproduced by credit card imprinting or swipe machines. If the authorization check fails, the transaction is stopped immediately. Otherwise, the processing further continues. However, customers who commit fraud often utilize methods which avoid being detected by standard payment authorization techniques. For example, the customer 102 intercepts credit cards along with the associated address information, in the mail and uses the credit cards before the cards are reported stolen to the issuing company. Further, these standard payment authorization techniques may fail to work with internationally originated transactions 100.

The transaction 100 is also checked to see if the value of the commodities 112 being purchased is greater than a pre-determined threshold amount 208 (Block 206). A vendor 106 may determine that transactions 100 whose total value is less a particular threshold are less likely to be fraudulent. Low value transactions 100 are bypassed from further fraud processing to avoid wasting resources, and the transaction 100 is accepted (Block 230). The pre-determined threshold 208 is vendor 106 specific or generalized for multiple vendors 106 and vendors 106 may adjust their threshold 208 periodically. Each vendor 106 may experience more or less fraud for commodities with differing values. In addition, the pre-determined threshold may be dynamically adjusted to account for other transaction parameters 116 and the results of other fraud detection algorithms (as discussed below). An exemplary pre-determined threshold value is $100.00.

If the value is greater than the pre-determined transaction amount threshold, transaction parameters 116 of the transaction 100 are compared against a positive database 212 (Block 210). The positive database 212 maintains customer 102 identity information, including one or more of the transaction parameters from past transactions which have been determined to be non-fraudulent. Such customer identity information may include the customer name, credit card number, checking account number, address or combinations thereof. This database 212 accounts for customers 102 who have a known good relationship with a vendor 106 but often have their transactions 100 flagged as fraudulent by fraud detection system 108 for other reasons such as a high transaction amount, shipping to a high risk zip code or an unusually high frequency of orders ("velocity"). As the nature of such positive information is likely highly confidential, such positive databases 212 and comparisons (Block 210) are preferably completed internally to said vendor 106. In addition, this positive data tends to be vendor specific, i.e. just because a customer has not committed fraud at one vendor does not necessarily mean they are not likely to commit fraud at another vendor. If the current customer 102 is found in the positive database 212, the transaction 100 is bypassed from further processing, and the transaction accepted (Block 230). Otherwise the fraud detection system continues its analysis (Block 214). In alternative embodiments, the positive identification is used to decrease the likelihood of a false positive result from the fraud detection system.

In order to further analyze the parameters 116, the form of payment which the customer 102 is using is determined (Blocks 218, 220). Credit card based transactions 100 have different parameters 116 than bank draft or check based transactions 100. In alternative embodiments, the transaction 100 environment is determined, i.e. whether the transaction 100 is originating from a retail establishment, a telephone ordering vendor or an e-commerce based vendor.

In one embodiment, the transaction parameters 116 are formatted and transmitted to a consumer information provider 224 who completes the fraud detection process (Block 222). The consumer information provider 224 is preferably an entity external to the vendor 106 and is preferably a fraud detection service provider who provides fraud detection services to multiple vendors 106. Alternatively, the consumer information provider 224 is another vendor 106 which sells excess fraud processing capacity as a service to other vendors 106 or the consumer information provider 224 is an internal part of the vendor 106 (e.g. part of or coupled with the order processing system 104). The consumer information provider 224 returns a signal 118 indicating whether or not the transaction 100 is likely fraudulent (Block 226). If the transaction is likely non-fraudulent (Block 228), the transaction is accepted (Block 230) and the commodities 112 are delivered. If the transaction 100 is likely fraudulent (Block 228), the system performs the desired vendor specific action to combat this potential fraud (Block 232). For example, the system cancels the transaction and prevents delivery of the commodities 112 to the customer 102, or the transaction is flagged for further review.

Figure 2B:
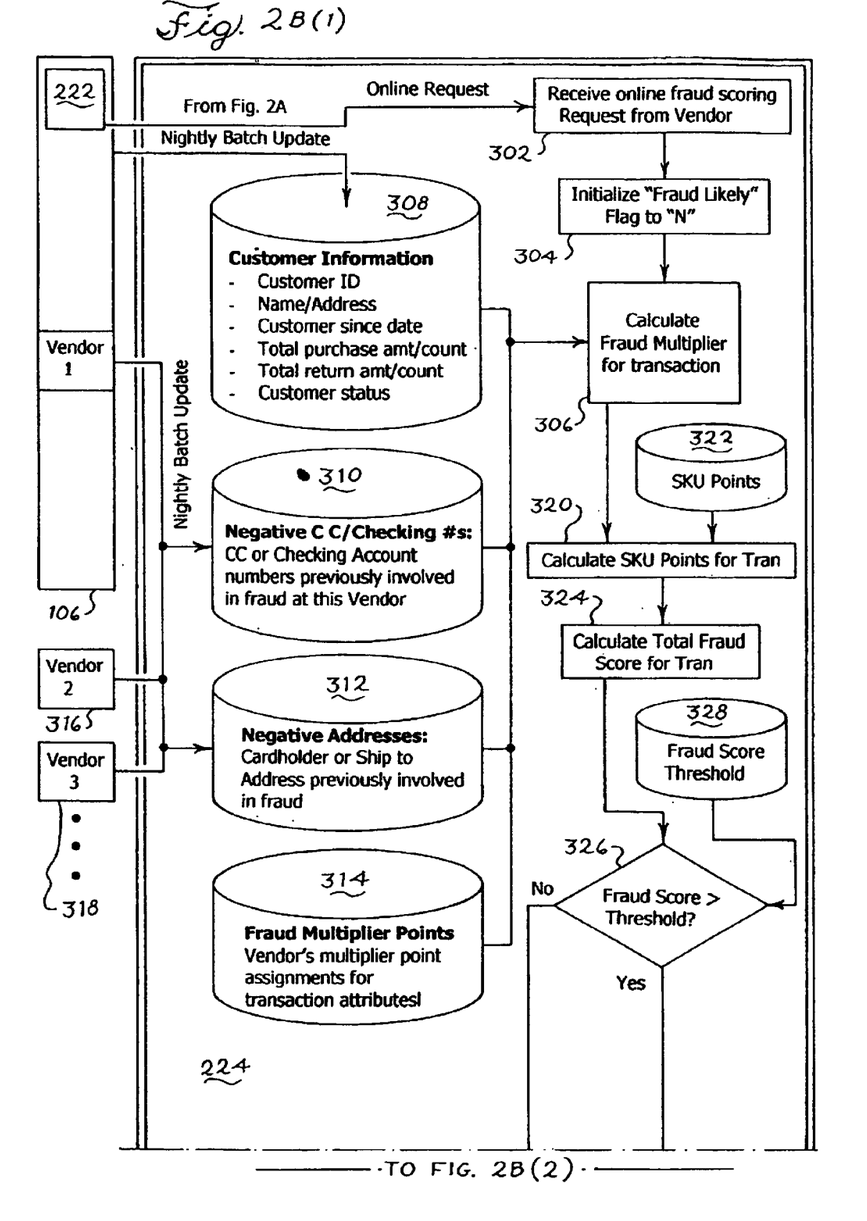

Referring now to FIG. 2B, there is shown a flow chart depicting the fraud detection processing undertaken by the consumer information provider 224. The consumer information provider 224 receives the request to determine the fraudulent status of a transaction 100 and the accompanying transaction parameters from the vendor 106 (Block 302). This request is transmitted by telephone, network, Internet or other communication medium. Initially, the transaction 100 is assumed to be non-fraudulent and subsequent processing determines if the transaction is likely fraudulent (Block 304). In alternative embodiments, the initial assumption is that the transaction is likely fraudulent and subsequent processing attempts to disprove this.

The consumer information provider 224 first computes a fraud multiplier for the transaction 100 (Block 306). The fraud multiplier is a score based on the value of the transaction parameters 116 and whether the transaction parameters authenticate against databases 308, 310, 312 of known information. These databases 308, 310, 312 include a customer information database 308, a negative account database 310 and a negative address database 312. Generally, these databases 308, 310, 312 contain specific customer and consumer information, statistical data and historical transaction data known to the participating vendors 106, 316, 318.

The customer information database 308 is a collection of information about the customers 102 of each of the vendors 106, 316, 318. There will be a separate database 308 for each vendor 106, 316, 318 since such customer information is typically only relevant to the particular vendor that the customer belongs to. Alternatively, by collecting the information from each participating vendor 106, 316, 318 together, a broad database is provided to all of the vendors 106, 316, 318, enhancing the accuracy of the fraud detection system and reducing error rates. Further, where the consumer information provider 224 is an internal function of the vendor 106, or due to privacy issues, this data may represent only one vendor's customer information. The customer information database 308 preferably includes data representing information about existing customers such as the customer name, address, how long the customer has been a customer and information about one or more of their past transactions. In the e-commerce environment, this database 308 may further contain information such as the customer's Internet Protocol Address, e-mail address or domain address.

The negative account database 310 and the negative address database 312 include information about past transactions that are known to have been fraudulent. The negative account database 310 includes credit card account numbers and/or checking account numbers used in past fraudulent transactions. The negative address database 312 includes customer, card holder, or shipping addresses previously involved in fraudulent transactions. The data in the databases 310, 312 is provided by the participating vendors 106, 316, 318, financial institutions or other entities. The negative databases 310, 312 are provided as a recognition of the fact that a fraud committed or attempted against one vendor 106, 316, 318 is generally relevant information to all vendors 106, 316, 318. In this way, one vendor 106, 316, 318 benefits from the negative experience of another vendor 106, 316, 318.

The databases 308, 310, 312 may further include the positive databases 212 used in Block 210 of FIG. 2A so that this comparison may be performed by the fraud detection system 108. Alternatively, each participating vendor 106, 316, 318 has access to the other vendors' positive transaction history data where it is relevant across vendors 106, 316, 318. Where positive databases are included, the positive data is used by the fraud detection system 108 as a factor in the fraud multiplier computation and not to override the fraud determination process as is shown in FIG. 2A. Alternatively, where such positive data is relevant across vendors, it may be used to bypass further fraud processing and approve the transaction. Additional databases comprising publicly available data such as credit histories or bankruptcy information, whether internal to the fraud detection system or provided by third party entities, may also be used to augment one or more of the databases 308, 310, 312. Additional databases containing non-public information such as proprietary internal data from other vendors or other private entities, whether internally provided or provided by a third party entity, may also be included.

In addition to the above databases 308, 310, 312, a fraud multiplier point database 314 is also provided. The fraud multiplier point database 314 includes data representing the transaction parameters 116 that a participating vendor 106 provides with each fraud determination request. This data may be different or specific for each participating vendor 106, 316, 318 depending upon each vendors 106 transaction environment and fraud experience. In one embodiment, the data is stored in a common database 314 or alternatively, each vendor 106, 316, 318 may have their own database 314. For example, the customer status transaction parameter can be defined by each vendor 106, 316, 318. For vendors 106, 316, 318 that sell exclusive memberships but still allow non-members to transact, the customer status parameter may indicate a member or non-member status. Alternatively, the customer status parameter indicates a preferred status or how good of a customer that vendor 106, 316, 318 feels the customer is, poor, fair, good or excellent depending on the amount they buy or their frequency of returns, etc. For each transaction parameter 116, a corresponding point value is provided which represents the number of points to be computed into the fraud calculation (described in more detail below) if that particular transaction parameter authenticates or doesn't authenticate in one of the databases 308, 310, 312. The point values are determined at the discretion of each vendor 106 depending on their individual business environments and point values for the same transaction parameters 116 may vary from vendor 106 to vendor 106. For example, some vendors 106, 316, 318 may experience more fraud from particular geographic areas than other vendors 106, 316, 318. These vendors 106, 316, 318 then may assign higher point values to address matches with the particular zip codes covering those geographic areas then might be assigned by another vendor 106, 316, 318.

Some transaction parameters 116 are essentially Boolean variables which have a True value if the value of the parameter can be authenticated against one of the databases 308, 310, 312. In this case, the parameter 116 is assigned points based on whether it is true or false. In addition, some transaction parameters 116 are assigned points based on the value of that parameter 116. For example, the transaction parameter 116 representing the total value of the transaction 100 is assigned a specific number of points as a function of this value (e.g. 0.5 points per $100 of value).

Alternatively, the points assigned to a particular transaction parameter 116 are dependent on the values of one or more other transaction parameters. For example, a transaction parameter 116 representing the credit card number velocity is assigned points based on the frequency of use of that credit card number (itself another transaction parameter 116). A velocity is a frequency of use over a specified period of time or a specified number of transactions. Velocity checks are done for transaction 100 counts ("count velocity") as well as amounts ("amount velocity"), i.e. the frequency of transactions 100 of a particular value. The velocity checks are performed against customer 102 identities, credit card account numbers, checking account numbers and addresses, cardholder, ship-to or otherwise (e.g., the frequency of address changes). Other relationships can also be captured by the point assignments. For example, depending on the value of one or more transaction parameters 116, one or more other transaction parameters 116 may be further computed with a weighting to increase or decrease significance to the overall fraud determination. Generally, points or point and parameter relationships are assigned and/or computed for a particular transaction parameter 116 as a function of that parameter's 116 relationship to fraudulent transactions. (i.e. whether a particular value of a parameter 116, or relationship among parameters 116, is likely to indicate fraud or not). For example, in one embodiment, the point values for the transaction velocity parameter 116 are adjusted based on geographic dispersion of the locations from which each of the transactions, included in the velocity calculation, were initiated. This accounts for the likelihood of the customer 102 physically being present at all of those locations at the times when the transactions 100 were initiated. An exemplary fraud multiplier point database 314, corresponding transaction parameters 116 and points for a particular vendor 106, is shown in Table 1.0.

TABLE 1.0

| TRANSACTION PARAMETER | POINTS |
| --- | --- |
| Positive Database match | −5.00 |
| Negative Database (this vendor) match | +10.00 |
| Negative Database (other vendor) match | +8.50 |
| Not shipping to card holder address | +0.50 |
| Shipping to card holder address | −1.00 |
| Not shipping to customer address | +0.50 |
| Shipping to customer address | −1.00 |
| Shipping to Freight forwarder | +1.00 |

TABLE 1.0-continued

| TRANSACTION PARAMETER | POINTS |
| --- | --- |
| Third party address verification (AVS) ok | −1.00 |
| Third party address verification (AVS) partial ok | +2.50 |
| Third party address verification (AVS) not ok | +5.00 |
| Customer Svc. Rep. Suspects fraud | +5.00 |
| High risk zip code | +1.50 |
| Telephone order | +0.25 |
| Total transaction amount | +0.50/$100 |
| Air shipment | +0.50 |
| Customer duration | −0.05/year |
| Customer status = excellent | −1.00 |
| Customer status = good | −0.25 |
| Customer status = fair | +0.25 |
| Customer status = poor | +1.00 |
| Credit card amount velocity exceeded | +0.50 |
| Credit card count velocity exceeded | +0.50 |
| Customer amount velocity exceeded | +0.25 |
| Customer count velocity exceeded | +0.25 |
| Ship-to-address amount velocity exceeded | +0.50 |
| Ship-to-address count velocity exceeded | +0.50 |
| Card Verification Value (CVV2) mismatch | +0.50 |
| Card Verification Value (CVV2) match | −1.00 |

The databases 308, 310, 312, 314 are preferably updated periodically. For example, a batch update process is used from each participating vendor 106. Alternatively, the databases 308, 310, 312, 314 are updated in real time as each participating vendor 106 acquires the relevant data. These updates occur automatically or manually. The negative databases 310, 312 are updated by the participating vendors 106, 316, 318 with transactions 100 which are verified by the vendor 106, 316, 319 as being fraudulent. Records are removed from the negative databases 310, 312 when it is determined that the fraudulent indicativeness of the stored information is no longer accurate. In one embodiment, this occurs only after a manual review indicates that the record was entered into the negative databases 310, 312 in error or the customer's or address' fraudulent status has changed. The customer's fraudulent status may change, for example, after a specified time period has elapsed in which there has been no further fraudulent activity by that customer. An address' fraudulent status may change if it is determined that the previous occupants, who perpetrated the original fraud, have moved and new customers now live at the address. In alternative embodiments, records are removed from the negative databases 310, 312 automatically based on predetermined rules such as a defined period of non-fraudulent activity or through a combination of automated processes and manual review.

The fraud multiplier for the transaction is preferably computed by first determining the points for each transaction parameter 116, as discussed above. To compute the fraud multiplier, the points determined for each transaction parameter 116 are summed to compute a total score (Block 306). Alternatively, other mathematical formulae may be used to compute the fraud multiplier. It is preferable that a mathematical computation be used which is statistically designed to minimize the overall error rate for the fraud detection process.

Once the fraud multiplier has been computed, the fraud detection system next computes the SKU points for the transaction (Block 320). As was discussed above, a SKU is a unique identifier code which identifies particular commodities involved in transactions 100. Each commodity has a unique SKU. Each SKU is associated with a point value indicating that particular commodity's propensity to be the subject of fraud. For each participating vendor 106, 316, 318, an associated SKU point database 322 contains points for the SKU's of the commodities which the particular vendor trades in. The SKU points for the transaction 100 is computed by summing the individual SKU points for each commodity involved in the transaction. The sum of the SKU points (i.e. the minimum SKU point sum) is at least 1. This prevents a transaction 100 with a high fraud multiplier but involving SKU's with no associated points (i.e., SKU's with very low fraud potential) from attaining a fraud score of 0 (e.g., where a customer purchases 1000 tubes of lipstick). Where more than one of the same commodity is being purchased, the SKU points for each is included or alternatively, that commodity may only be counted once. Alternative mathematical formulae may also be used such as diminishing or increasing point values or dynamic point values. For example, the larger the quantity ordered of any one product, the higher the points for that product (i.e., where 500 lipsticks are ordered, the first 100 each have 0 points, the next 100 each have 10 points, the next 100 each have 20 points, etc.) to allow for the possibility that orders of large quantities of any one product are more likely to be fraudulent. However, the mathematical computation used is statistically designed to minimize the overall error rate for the fraud detection process. An exemplary SKU points database 322 showing SKU's and associated point values for a particular vendor 106 is shown in Table 2.0.

TABLE 2.0

| SKU | POINTS | DESCRIPTION |
| --- | --- | --- |
| XX001 | +10 | OFFICE CHAIR - LEATHER |
| XX002 | +10 | FAX MACHINE |
| XX003 | +10 | CORDLESS PHONE-900/DK/CID |
| XX004 | +10 | PLAIN PAPER FAX |
| XX005 | +10 | CORDLESS PHONE-900/2LINE/CID |
| XX006 | +10 | CORDLESS PH-900/2LINE/CID/TA |
| XX007 | +10 | COMM. BREWER W/COFFEE |
| XX008 | +40 | STEREO SYSTEM |
| XX009 | +20 | CD CHANGER/12 CAP |
| XX010 | +40 | CAMCORDER VHS-C |
| XX011 | +10 | BUTCHER BLOCK CART |
| XX012 | +10 | RED DEVIL GRILL |
| XX013 | +10 | PRESSURE COOKER |
| XX014 | +10 | SECURITY AUTO-DIALER |
| XX015 | +10 | CD RACK |
| XX016 | +15 | SECURITY CAMERA |
| XX017 | +10 | COCKTAIL TABLE |
| XX018 | +10 | END TABLE |
| XX019 | +10 | SOFA TABLE |
| XX020 | +10 | LOVESEAT-FLORAL |
| XX021 | +10 | SOFA-FLORAL |
| XX022 | +15 | COMPACT STEREO KEVLAR SPE |
| XX023 | +15 | COMPACT COMPONENT SYSTEM |
| XX024 | +15 | COMPACT COMPONENT DOLBY |
| XX025 | +40 | DVD PLAYER |
| XX026 | +10 | TREADMILL/0–10 MPH |
| XX027 | +20 | TV 1.6" |
| XX028 | +10 | CAMERA |
| XX029 | +15 | RACK SYSTEM |
| XX030 | +20 | 4HD VCR |

A total fraud score is computed from the fraud multiplier and the SKU points computed for the transaction (Block 324). The total fraud score is computed by multiplying the SKU points by the fraud multiplier. Alternatively, other mathematical computations may be used. The fraud score computation balances the SKU points vs. the other transaction parameters and is statistically designed to minimize the overall error rate for the fraud detection process. Since points can be subtracted from the fraud multiplier for positive transaction characteristics, the fraud score can be a negative number indicating that fraud is extremely unlikely.

The total fraud score is compared with a fraud score threshold 328 (Block 326). The fraud score threshold indicates the degree of potentially fraudulent behavior that indicates that the transaction 100 is likely fraudulent. Each participating vendor 106, 316, 318 may provide a fraud score threshold. An exemplary fraud score threshold is 50 points. Alternatively, multiple fraud score thresholds or a fraud score range are provided indicating a degree or range of fraudulently indicative behavior. In addition, the fraud score threshold may be a dynamic value, automatically adjusted based on the values of one or more of the transaction parameters 116 or SKU's of the commodities 112 involved. The dynamic fraud score threshold compensates for those parameters which do or do not indicate a substantial likelihood of fraud and may unbalance the computation.

If the fraud score is less than or equal (or alternatively just less than) to the fraud score threshold (Block 326), the consumer information provider 224 returns an indication back to the vendor 106 that the transaction is likely non-fraudulent (Block 338). If the fraud score is above the threshold, the consumer information provider 224 returns an indication that the transaction 100 is likely fraudulent. The returned indication may be a Boolean flag (i.e. likely fraudulent or not) or a confidence score related to the likelihood of the transaction 100 being fraudulent (e.g., "0", meaning fraud unlikely, to "9", meaning fraud extremely likely)

Alternatively, subsequent processing ensures that non-fraudulent transactions 100 are not mistakenly indicated as fraudulent. The transaction 100 is further checked against other consumer information databases 332 (Block 330). These other consumer information databases 332 are typically fee based and include proprietary databases of the consumer information provider 224 as well as third party public and non-public information sources. Access charges to these databases 332 are usually based on the nature of the database 332 and the nature of the authentication query or lookup being performed. For example, there may be a fixed fee charged for each address verification query. These databases 332 are alternate databases to the databases 308, 310, 312 used in the fraud multiplier computation (Block 306). Matches among the transaction parameters 116 and these alternative databases 332 can be used to diminish the likelihood that the current transaction 100 is fraudulent. It is preferred that these databases 332 be used to supplement the fraud determination process to minimize the external costs in accessing fee based data. In addition, some vendors 106 may prefer to supplement their fraud determination with more or fewer checks against the databases 332, depending on the amount of access charges they are comfortable incurring versus the added benefit to the determination of fraud.

If it is determined that the check of the alternate databases 332 has made it unlikely that the current transaction is fraudulent (Block 334), a non-fraudulent indicator is returned to the vendor 106 for further processing as described above (Block 338). Otherwise an indicator indicating that the current transaction 100 is likely fraudulent is returned to the vendor 106 (Block 338). In one embodiment, the customer address, card holder address and ship-to address are all verified against databases 332. If all three match, the fraud score is overridden and the transaction is approved. Alternatively, a less stringent match is required or other parameters are verified in place of or in addition to the addresses. In yet another alternative embodiment, the authentication results from the databases 332 are, themselves, assigned point values. Utilizing these point values, the fraud score is recomputed and re-compared against the fraud score threshold. Alternatively, the authentication results can be used to weight the point values of one or more of the transaction parameters 116 in the fraud multiplier computation and the fraud score is recomputed.

As the fraud detection system 108 operates, there may be errors (i.e. false positive and false negative responses from the system which are later determined by the vendor 106 or consumer information provider 224). In one embodiment, as these errors occur, the mis-flagged transactions 100 may be further reviewed or analyzed, either manually or automatically, by fraud investigators, to determine why the system failed. Where it is determined that a particular transaction parameter 116 or SKU is not accounted for or has an unbalanced effect on the fraud determination process, the databases 308, 310, 312, 314 are adjusted to correct the error. Such adjustments include altering point values, defining new or refining existing inter-parameter relationships or defining additional transaction parameters to be considered.

Further, the disclosed fraud detection system is capable of detecting fraud generally and not just specific instances of fraud such as a bad check or a stolen credit card. For example, the disclosed fraud detection system detects fraudulent use of coupons or discounts, fraudulent use of insurance for medical, dental or automobile related vendors 106 or fraudulent use of prescriptions for pharmaceutical related vendors 106. All of the characteristics of the transaction are balanced so that factors which are more likely to indicate fraud have a larger impact on the determination but other factors and relationships among factors are still significantly considered.

In addition, while the above processes, comparisons and computations are disclosed as being performed in a particular order, in alternative embodiments the performance order may be different and all orderings are contemplated. For example, in one embodiment, the SKU points are computed prior to the computation of the fraud multiplier.

The disclosed processes, comparisons and computations are preferably implemented in software as computer programs written in the RPG language. The software and databases are preferably executed on an AS/400 computer system manufactured by IBM Corporation, located in Armonk, N.Y. The computer systems are preferably executing the OS/400 4.0 or higher version operating system provided by IBM. The databases are preferably implemented using the AS/400's Integrated File System. Alternatively, the software and databases are implemented on a mainframe computer system complying with the IBM 390 architecture. In still another embodiment, the software and databases are implemented on an RS/6000 computer system manufactured by IBM Corporation utilizing the UNIX operating system. In still another alternative embodiment, the software and databases are implemented using the Structured Query Language and executed on a computer system having a processor equivalent to a Pentium III or better, manufactured by Intel Corporation, located in Santa Clara, Calif. and utilizing the Microsoft Windows NT 4.0 Operating System and Microsoft SQL server manufactured by Microsoft Corporation located in Redmond, Wash. In further embodiments, one or more of the component parts of the fraud detection system are implemented directly in hardware. It will be appreciated that the implementation details will vary depending on the hardware and software environments of the participating vendors 106, 316, 318 and the consumer information provider 224.

In the first embodiment, most of the fraud processing is external to the vendor 106 and can therefore be implemented in the single computing environment of the consumer information provider. This contains development of the fraud detection system to a single computing platform and single programming language, etc. easing development and maintenance complexity.

Second Embodiment

Figure 3A:
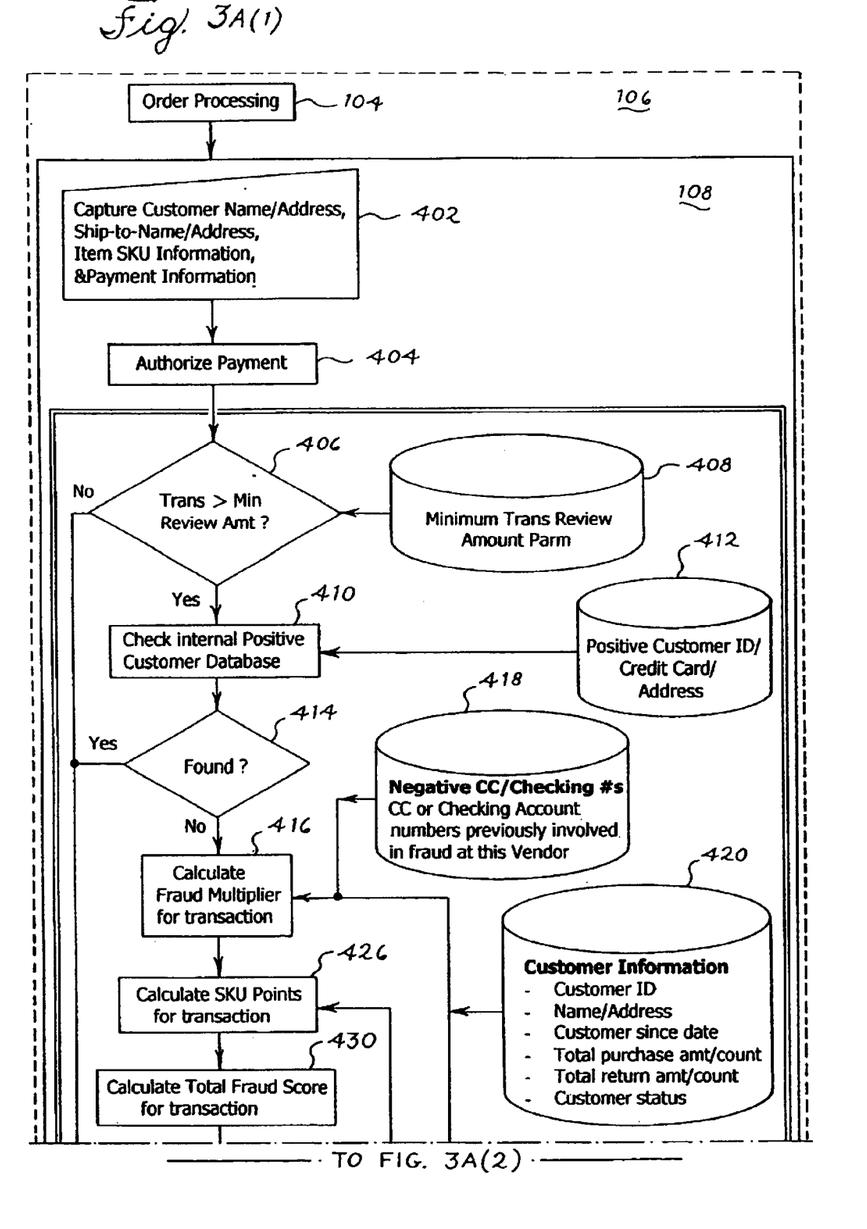
FIGS. 3A & 3B depicts a flow chart detailing a second embodiment of a preferred fraud detection system.
Figure 3B:
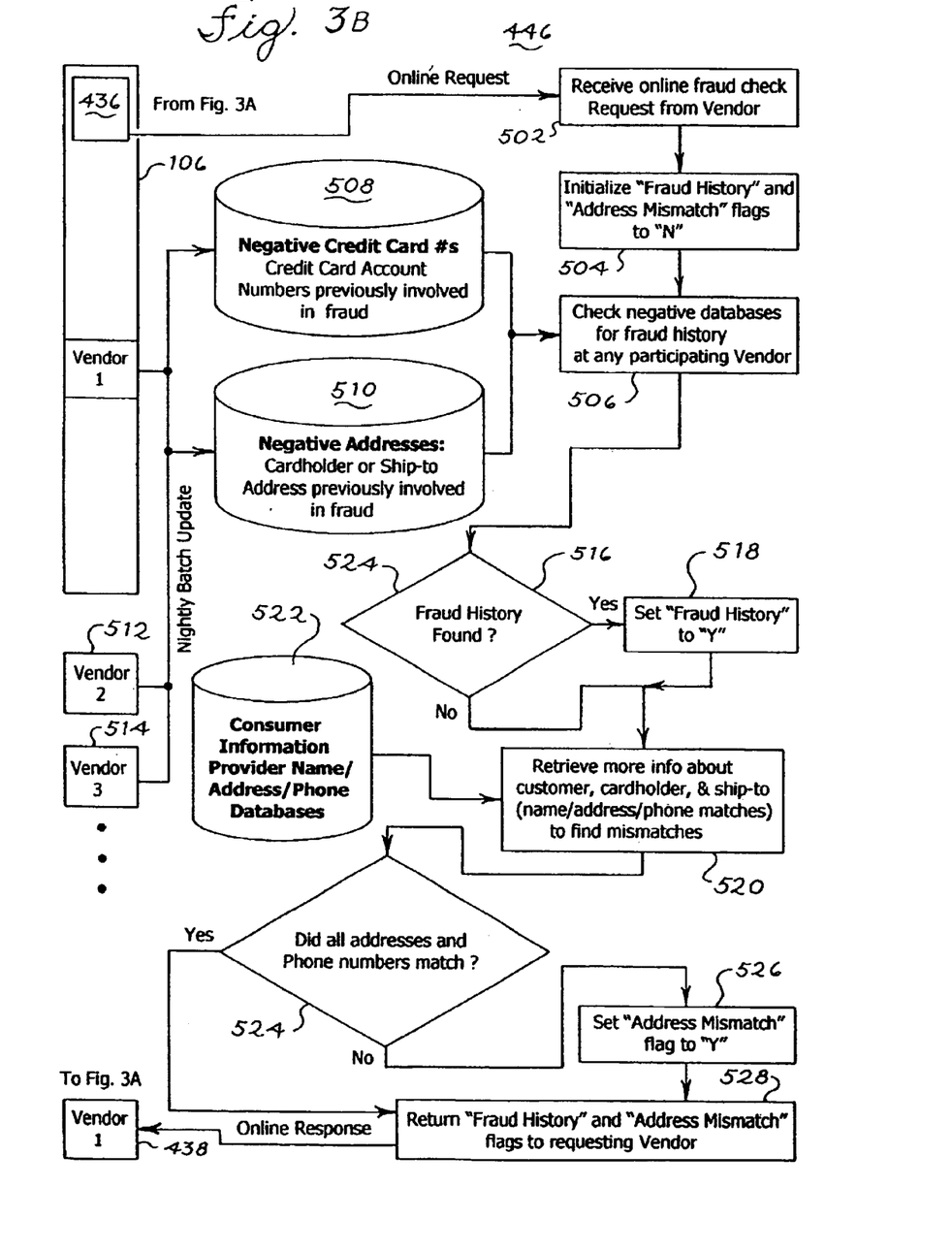

FIGS. 3A and 3B show a second embodiment of the fraud detection system 108. This embodiment differs from the first embodiment only in the division of processing between the vendor 106 and the consumer information provider 446 which may or may not be external to the vendor 106, as described above.

Referring to FIG. 3A, most of the processing remains internal to the vendor 106, including the computation of the fraud multiplier (Block 416), computation of the SKU points (Block 426), and computation of the total fraud score (Block 430) as well as the associated databases 418, 420, 422, 424, 428, 434. In this embodiment, however, the negative information databases 418, 422 only contain negative information collected by or imparted to this particular vendor 106. The secondary checking that occurs when the fraud score has exceeded the fraud score threshold is performed by the consumer information provider 446 (Blocks 432, 436). Typically, this secondary checking involves access to fee-based databases (as described above). In one embodiment, the decision to perform secondary checking by the consumer information provider 446 is manually determined after a manual review of the transaction 100. Alternatively, the secondary checking can be automatically performed for all transactions 100 whose fraud score exceeds the fraud score threshold or the decision to perform secondary checking can be based on one or more transaction parameters 116 and resultant point values. In yet another alternative embodiment, secondary checking with the consumer information provider 446 is done for specific transaction parameters 116 such as the customer, cardholder and ship-to addresses with subsequent secondary checking of other transaction parameters determined at the discretion of a manual reviewer.

Referring to FIG. 3B, the consumer information provider 446 checks the transaction 100 against negative databases 508, 510 which contain negative transaction information from other participating vendors 106, 512, 514 or sources (Block 506). From this information, it is determined whether or not there is a history of related fraud (Block 518). Further secondary checking is performed as described above against other proprietary, other public and non-public databases to further confirm the fraudulent status of the transaction 100 (Blocks 520, 524, 526). The fraud history, if any, and the results of the secondary checking are returned to the vendor 106 (Block 528).

Referring back to FIG. 3A, the fraud detection system determines the likelihood of fraud based on the total fraud score and the data returned by the consumer information provider 446. In one embodiment, the fraud score and the data returned by the consumer information provider 446 are manually reviewed and reconciled to determine the likelihood of fraud (Block 440). Alternatively, the data returned by the consumer information provider 446 and the fraud score are automatically reconciled to determine the fraudulent status. For example, the data returned by the consumer information provider is used to add or subtract points from the fraud multiplier and the fraud score is recomputed and re-compared with the fraud threshold. If it is determined that the transaction 100 is non-fraudulent, the transaction is accepted (Block 442). If it is determined that the transaction is fraudulent, further action can be taken as described above (Block 444).

In addition to the advantages noted above for the first embodiment, the second embodiment offers easy data management and lower bandwidth requirements between the vendor 106 and the consumer information provider 446. The main databases 418, 420, 422, 424, 428, 434 reside internally to the vendor 106 making updates and adjustments simpler and faster. Further, the amount of data needed to pass to the consumer information provider 446 is reduced since the consumer information provider 446 performs less of the overall fraud detection process. Further, the second embodiment provides a high reliability system which is not subject to communications problems between the vendor 106 and the consumer information provider 446. In the event of a communications failure, the system still detects fraudulent transactions 100. Finally, an internal system for detecting fraud operates and responds faster than a system which relies more heavily on external processing.

It is therefore intended that the foregoing detailed description be regarded as illustrative rather than limiting, and that it be understood that it is the following claims, including all equivalents, that are intended to define the spirit and scope of this invention.

We claim:

1. A computer implemented system for detecting fraudulent transactions between a customer and a vendor, said computer comprising a memory and a processor coupled with said memory, said system comprising:

a positive database comprising data representing a plurality of past non-fraudulent transactions known to said vendor;

a negative database comprising data representing a plurality of past known fraudulent transactions;

one or more transaction databases comprising consumer and geographic transaction information;

a commodity database comprising data representing valuation and propensity to incite fraudulent activity for a plurality of commodities;

transaction logic resident in said memory and operative to be executed by said processor to receive a transaction of a commodity from a vendor and decompose said transaction into a plurality of transaction parameters, said plurality of transaction parameters being characterized by an authenticity;

result logic resident in said memory and operative to be executed by said processor to send an indication to said vendor whether said transaction is one of fraudulent and non-fraudulent;

valuation logic resident in said memory and coupled with said transaction logic, said result logic and said commodity database and operative to be executed by said processor to compute the total value of said transaction and cause said result logic to indicate that said transaction is non-fraudulent if said total value is less than a first pre-determined threshold;

comparison logic resident in said memory and coupled with said transaction logic, said result logic and said positive database and operative to be executed by said processor to compare said transaction with said positive database and cause said result logic to indicate that said transaction is non-fraudulent if said transaction matches at least one of said plurality of past non-fraudulent transactions in said positive database; and fraud logic resident in said memory and coupled with said transaction logic, said result logic and said negative database, said one or more transaction databases and said commodity database and operative to be executed by said processor to compute a first score as a function of said past fraudulent transactions and said propensity to incite fraudulent activity of said commodity, a second score as a function of said authenticity of said plurality of transaction parameters and a fraud score as a function of said first and second scores, said fraud logic being further operative to cause said result logic to indicate that said transaction is fraudulent if said fraud score exceeds a second pre-determined threshold.

2. The system of claim 1, wherein one or more of said positive database, said negative database, said one or more transaction databases, said commodity database, said transaction logic, said result logic, said valuation logic, said comparison logic and said fraud logic operates on a computer system internal to said vendor and the remaining of said one or more of said positive database, said negative database, said one or more transaction databases, said commodity database, said transaction logic, said result logic, said valuation logic, said comparison logic and said fraud logic operates on a computer system external to said vendor, said internal and external computer systems in communication with each other.

3. The system of claim 1, wherein said fraud logic is further coupled with said valuation logic and further wherein said second score is dynamically adjusted as a function of said total value.

4. The system of claim 1, wherein said fraud logic is further coupled with said valuation logic and further wherein said second pre-determined threshold is dynamically adjusted as a function of said total value.

5. The system of claim 1, wherein said system is operative to process said transaction in real time.

6. The system of claim 1, wherein said system is operative to receive two or more of said transactions and process said two or more of said transactions in batch.

* * * * *